(12) United States Patent
Yoshioka (10) Patent No.: US 10,549,715 B2
(45) Date of Patent: Feb. 4, 2020

(54) PRETENSIONER, SEATBELT RETRACTOR, SEATBELT DEVICE, AND METHOD OF MANUFACTURING PRETENSIONER

(71) Applicant: Takata Corporation, Tokyo (JP)

(72) Inventor: Hirokazu Yoshioka, Shiga (JP)

(73) Assignee: JOYSON SAFETY SYSTEMS JAPAN K.K., Tokyo (JP)

(*) Notice: Subject to any disclaimer, the term of this patent is extended or adjusted under 35 U.S.C. 154(b) by 84 days.

(21) Appl. No.: 15/850,331

(22) Filed: Dec. 21, 2017

(65) Prior Publication Data

US 2018/0178752 A1 Jun. 28, 2018

(30) Foreign Application Priority Data

Dec. 28, 2016 (JP) ................................ 2016-255444

(51) Int. Cl.
*B60R 22/46* (2006.01)

(52) U.S. Cl.
CPC ...... *B60R 22/4619* (2013.01); *B60R 22/4628* (2013.01); *B60R 22/4633* (2013.01); *B60R 2022/4647* (2013.01)

(58) Field of Classification Search
CPC ....... B60R 22/343; B60R 22/36; B60R 22/38; B60R 22/40; B60R 22/405; B60R 22/4619; B60R 22/4628; B60R 22/4633; B60R 22/4638; B60R 2022/4642; B60R 2022/4647
See application file for complete search history.

(56) References Cited

U.S. PATENT DOCUMENTS

| 5,782,423 | A | 7/1998 | Miller, III et al. |
| 5,881,962 | A * | 3/1999 | Schmidt .............. B60R 22/4628 242/374 |
| 6,419,176 | B1 * | 7/2002 | Mizuno ............... B60R 22/4628 242/374 |
| 7,887,095 | B2 * | 2/2011 | Bieg .................... B60R 22/4628 280/806 |
| 8,616,484 | B2 * | 12/2013 | Ito ....................... B60R 22/4628 242/374 |
| 9,358,952 | B2 * | 6/2016 | Yanagawa ........... B60R 22/4633 |
| 9,475,455 | B2 | 10/2016 | Gray et al. |
| 9,555,768 | B2 | 1/2017 | Gray et al. |

(Continued)

FOREIGN PATENT DOCUMENTS

| DE | 10343195 | 10/2004 |
| DE | 102006015345 | 10/2007 |

(Continued)

*Primary Examiner* — Laura Freedman
(74) *Attorney, Agent, or Firm* — IPUSA, PLLC (57) ABSTRACT

A pretensioner includes a drive wheel provided with a plurality of engaging teeth for rotating a spool, the spool for winding up a webbing for fastening a passenger; and an elongated resin component that transmits power to the drive wheel during an emergency, wherein the plurality of teeth is positioned such that, when one engaging tooth is caused to contact a tip of the elongated resin component in an approximately planer manner, another engaging tooth adjacent to the one engaging tooth in a direction opposite to a rotation direction can contact a side surface of the elongated resin component.

8 Claims, 7 Drawing Sheets

(56) References Cited

U.S. PATENT DOCUMENTS

| | | | |
|---|---|---|---|
| 2002/0060261 A1* | 5/2002 | Kameyoshi | B60R 22/4628 242/374 |
| 2004/0195421 A1 | 10/2004 | Singer et al. | |
| 2007/0241550 A1 | 10/2007 | Bieg et al. | |
| 2013/0327873 A1 | 12/2013 | Gentner et al. | |
| 2014/0014758 A1 | 1/2014 | Gentner et al. | |
| 2014/0145020 A1 | 5/2014 | Gentner et al. | |
| 2014/0224915 A1* | 8/2014 | Yanagawa | B60R 22/46 242/382 |
| 2015/0274122 A1 | 10/2015 | Yanagawa et al. | |
| 2016/0114762 A1 | 4/2016 | Landbeck et al. | |
| 2016/0288769 A1 | 10/2016 | Landbeck et al. | |
| 2017/0182974 A1 | 6/2017 | Moedinger et al. | |
| 2017/0305386 A1* | 10/2017 | Asako | A44B 11/2561 |
| 2019/0092276 A1* | 3/2019 | Takamatsu | B60R 22/4676 |

FOREIGN PATENT DOCUMENTS

| | | | |
|---|---|---|---|
| DE | 102006031359 | 10/2007 | |
| DE | 102006031360 | 10/2007 | |
| DE | 102006031369 | 10/2007 | |
| DE | 102010051419 | 5/2012 | |
| DE | 102010051422 | 5/2012 | |
| DE | 102010054846 | 6/2012 | |
| DE | 102011016153 | 10/2012 | |
| DE | 102013018722 | 5/2015 | |
| DE | 102015104861 | 10/2015 | |
| DE | 102014006499 | 11/2015 | |
| DE | 102015000203 | 7/2016 | |
| EP | 3199411 | 8/2017 | |
| JP | 2000296760 A * | 10/2000 | |
| JP | 2001233176 A * | 8/2001 | |
| JP | 3617859 | 2/2005 | |
| JP | 2014-500178 | 1/2014 | |
| JP | 2016-104608 | 6/2016 | |
| JP | 5975845 | 8/2016 | |
| JP | 5975846 | 8/2016 | |
| WO | WO-2005066001 A1 * | 7/2005 | B60R 22/4628 |
| WO | 2014/194993 | 12/2014 | |
| WO | 2016/047338 | 3/2016 | |

\* cited by examiner

PRETENSIONER, SEATBELT RETRACTOR, SEATBELT DEVICE, AND METHOD OF MANUFACTURING PRETENSIONER

BACKGROUND OF THE INVENTION

1. Field of the Invention

The present disclosure relates to a pretensioner, a seatbelt retractor, a seatbelt device, and a method of manufacturing a pretensioner. In particular, the present disclosure relates to a pretensioner, a seatbelt retractor, a seatbelt device and a method of manufacturing a pretensioner in which an elongated resin component is used as a power transmission component.

2. Description of the Related Art

In general, in a vehicle, such as an automobile, a seatbelt device is installed, which is for fastening a passenger to a seat provided with a seat part on which the passenger is seated and a backrest part positioned behind the passenger. Such a seatbelt device includes a webbing for fastening a passenger; a seatbelt retractor for winding up the webbing; a guide anchor, which is installed at a vehicle body side, for guiding the webbing; a belt anchor for securing the webbing at the vehicle body side; a buckle positioned at a side surface of the seat; and a seatbelt tongue attached to the webbing. By attaching the seatbelt tongue to the buckle, the passenger can be fastened to the seat by the webbing.

In many cases a pretensioner is attached to such a seatbelt retractor. The pretensioner is for removing a slack in the webbing during an emergency, such as vehicle collision. Furthermore, recently, the use of an elongated resin component (a resin rod) as a power transmission component for rotating a spool during an emergency has been studied (cf. Patent Document 1 (cf. PCT Japanese Translation Patent Publication No. 2014-500178, for example)).

The invention described in Patent Document 1 is such that shapes of gear teeth of a drive wheel are improved, so that the gear teeth of the drive wheel engage a power transmission component (an elongated resin component) to efficiently transmit torque. Note that the drive wheel may also be referred to as a driving wheel, a drive gear, or a ring gear.

In such a pretensioner using the elongated resin component, a load becomes maximum during initial motion at which the elongated resin component collides with the teeth of the drive wheel to rotate the drive wheel. However, when the elongated resin component is separated from the teeth of the drive wheel in the initial state, a problem arises such that the energy is wastefully consumed until the drive wheel is caused to rotate, or such that, when the elongated resin component collides with the drive wheel, stress concentrates on the tip of the elongated resin component.

There is a need for a pretensioner, a seatbelt retractor, and a seatbelt device such that, while mitigating concentration of the stress generated in the elongated resin component, the drive wheel can be efficiently rotated.

SUMMARY OF THE INVENTION

According to an aspect of the present disclosure, there is provided a pretensioner including a drive wheel provided with a plurality of engaging teeth for rotating a spool, the spool for winding up a webbing for fastening a passenger; and an elongated resin component that transmits power to the drive wheel during an emergency, wherein the plurality of teeth is positioned such that, when one engaging tooth is caused to contact a tip of the elongated resin component in an approximately planer manner, another engaging tooth adjacent to the one engaging tooth in a direction opposite to a rotation direction can contact a side surface of the elongated resin component.

According to another aspect of the present disclosure, there is provided a seatbelt retractor including a spool for winding up a webbing for fastening a passenger; and a pretensioner for winding up the webbing to remove a slack during an emergency, wherein the pretensioner includes a drive wheel provided with a plurality of engaging teeth for driving the spool, and an elongated resin component that transmits power to the drive wheel during the emergency, and wherein the plurality of teeth is positioned such that, when one engaging tooth is caused to contact a tip of the elongated resin component in an approximately planer manner, another engaging tooth adjacent to the one engaging tooth in a direction opposite to a rotation direction can contact a side surface of the elongated resin component.

According to another aspect of the present disclosure, there is provided a seatbelt device including a webbing for fastening a passenger, a seatbelt retractor for winding up the webbing, a buckle positioned at a seat, and a seatbelt tongue attached to the webbing, wherein the seatbelt retractor includes a spool for winding up the webbing, and a pretensioner for winding up the webbing to remove a slack during an emergency, wherein the pretensioner includes a drive wheel provided with a plurality of engaging teeth for driving the spool, and an elongated resin component that transmits power to the drive wheel during the emergency, and wherein the plurality of teeth is positioned such that, when one engaging tooth is caused to contact a tip of the elongated resin component in an approximately planer manner, another engaging tooth adjacent to the one engaging tooth in a direction opposite to a rotation direction can contact a side surface of the elongated resin component.

In the above-described pretensioner, seatbelt retractor, and seatbelt device, the one engaging tooth may be provided with a gear tooth surface to contact the elongated resin component in a planer manner. Further, the elongated resin component may be provided with a tapered surface to contact the gear tooth surface of the engaging tooth in a planer manner. Further, the elongated resin component may be provided with a recess on the side surface, the recess being capable of locking a tip of the adjacent engaging tooth.

Furthermore, according to another aspect of the present disclosure, there is provided a method of manufacturing a pretensioner including a drive wheel provided with a plurality of engaging teeth for rotating a spool, the spool for winding up a webbing for fastening a passenger, and an elongated resin component that transmits power to the drive wheel during an emergency, wherein the drive wheel is formed such that, when one engaging tooth is caused to contact a tip of the elongated resin component in an approximately planer manner, another engaging tooth adjacent to the one engaging tooth in a direction opposite to a rotation direction contacts a side surface of the elongated resin component.

In the above-described method of manufacturing the pretensioner, a recess may be formed on the side surface of the elongated resin component, the recess being for locking a tip of the adjacent engaging tooth.

According to the above-described pretensioner, seatbelt retractor, seatbelt device, and method of manufacturing the pretensioner, the engaging tooth of the drive wheel and the tip of the elongated resin component are caused to contact each other in an approximately planer manner, and the adjacent engaging tooth in the direction opposite to the rotation direction is caused to contact the side surface of the elongated resin component, so that, when the elongated resin component moves, the elongated resin component causes the drive wheel to rotate by pressing, at the same time, the engaging tooth of the drive wheel, so as to cause the engaging tooth of the drive wheel to rotate and, at the same time, to bite the side surface of the elongated resin component. Accordingly, kinetic energy of the elongated resin component can be efficiently converted into rotational energy, and, while mitigating concentration of stress generated in the elongated resin component, the drive wheel can be efficiently rotated.

Other objects, features and advantages of the present invention will become more apparent from the following detailed description when read in conjunction with the accompanying drawings.

DESCRIPTION OF THE PREFERRED EMBODIMENTS

Figure 1:
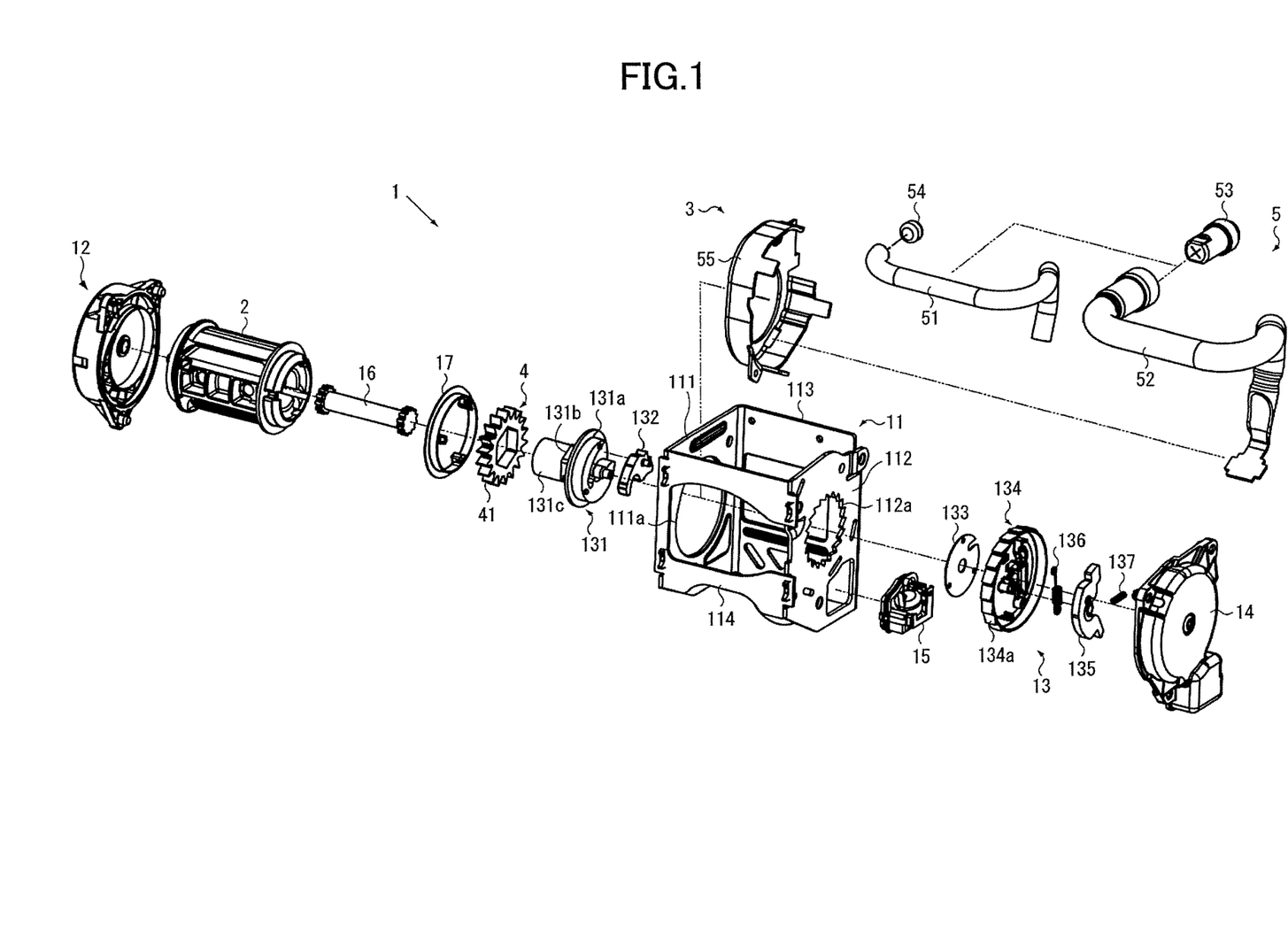
FIG. 1 is a diagram illustrating a disassembled component, which represents a seatbelt retractor according to an example of the present disclosure.
Figure 2A:
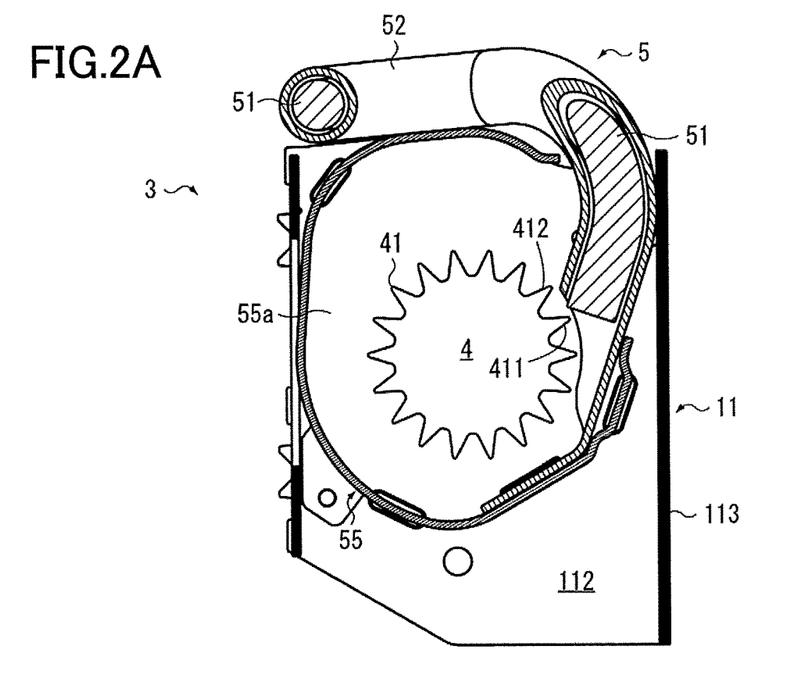
FIG. 2A is a cross-sectional view illustrating an initial state of a pretensioner illustrated in FIG. 1.
Figure 2B:
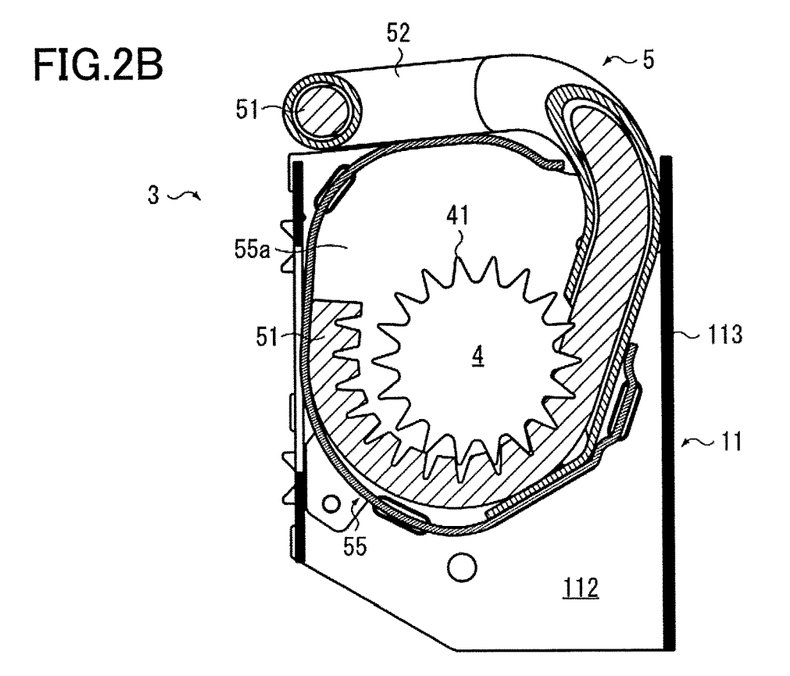
FIG. 2B is a cross-sectional view illustrating an operating state of the pretensioner.
Figure 3A:
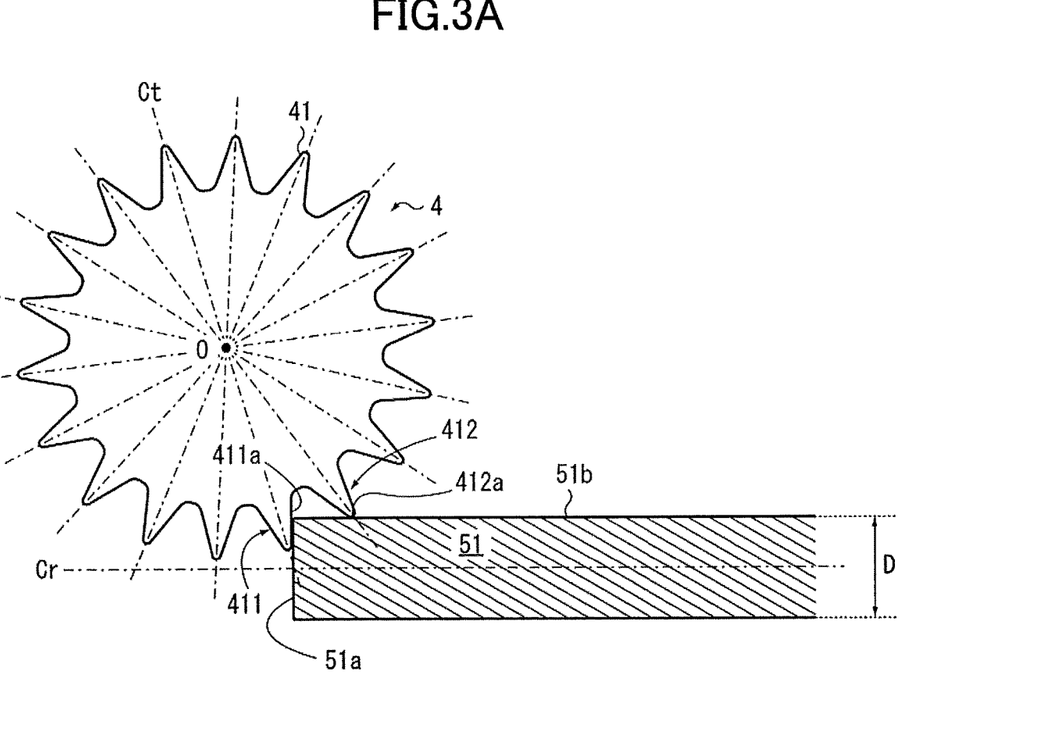
FIG. 3A is a partially enlarged view of the pretensioner illustrated in FIG. 1, which indicates positional relation between a drive wheel and an elongated resin component.
Figure 3B:
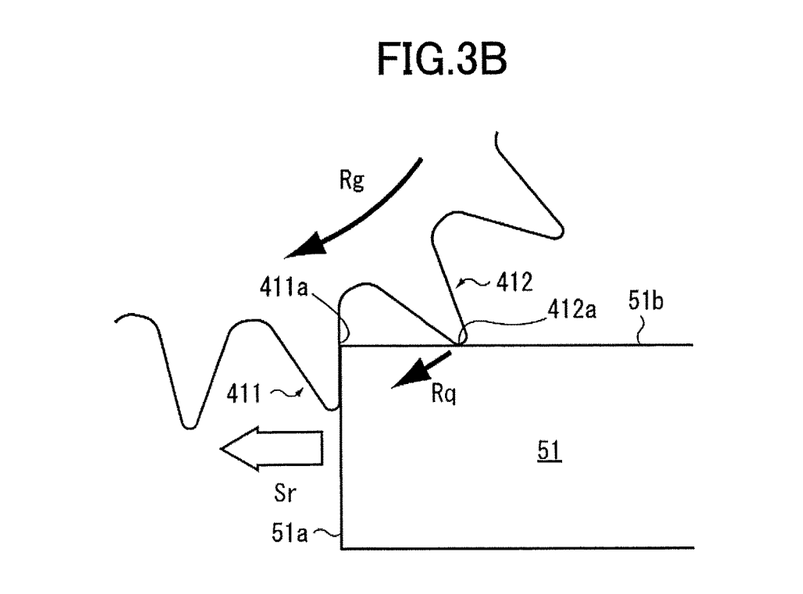
FIG. 3B is a partially enlarged view of the pretensioner illustrated in FIG. 1, which indicates movement of the drive wheel.

In the following, examples of the present disclosure are described by referring to FIG. 1 through FIG. 7. Here, FIG. 1 is a diagram illustrating a disassembled component, which represents a seatbelt retractor according to an example of the present disclosure. FIG. 2A is a cross-sectional view illustrating an initial state of the pretensioner illustrated in FIG. 1. FIG. 2B is a cross-sectional view illustrating an operating state of the pretensioner. FIG. 3A is a partially enlarged view of the pretensioner illustrated in FIG. 1, which indicates positional relation between a drive wheel and an elongated resin component. FIG. 3B is a partially enlarged view of the pretensioner illustrated in FIG. 1, which indicates movement of the drive wheel.

For example, as illustrated in FIG. 1 through FIG. 3B, the seatbelt retractor 1 according to the example of the present disclosure includes a spool 2 for winding up a webbing for fastening a passenger and a pretensioner 3 for winding up the webbing to remove a slack during an emergency. The pretensioner 3 includes a drive wheel 4 provided with a plurality of engaging teeth 41 for rotating a spool 2 and an elongated resin component 51 for transmitting power to the drive wheel 4 during an emergency. The plurality of engaging teeth 41 is positioned such that, when one engaging tooth (first engaging tooth 411) is caused to approximately contact a tip of the elongated resin component 51 in a planer manner, another engaging tooth (second engaging tooth 412) adjacent to the one engaging tooth (first engaging tooth 411) in a direction opposite to a rotation direction can contact a side surface of the elongated resin component 51.

The spool 2 is a winding drum for winding up the webbing, and the spool 2 is accommodated inside a base frame 11, which forms a frame of the seatbelt retractor 1. The base frame 11 is provided with, for example, a pair of end faces 111 and 112 facing each other and a side face 113 for coupling the end faces 111 and 112. The base frame 11 may be provided with a tie plate 114 that faces the side face 113 and that is coupled to the end faces 111 and 112. Further, for example, a spring unit 12 is placed at the side of the end face 111, and the pretensioner 3 and a lock mechanism 13 are placed at the side of the end face 112. Note that the arrangement of the spring unit 12, the pretensioner 3, the lock mechanism 13, etc., is not limited to the depicted configuration.

Further, an opening 111a for inserting the spool 2 is formed in the end face 111 of the base frame 11, and an opening 112a provided with internal teeth capable of engaging a pawl 132 of the lock mechanism 13 is formed in the end face 112 of the base frame 11. Further, at an inner side of the end face 112 of the base frame 11, a part of the pretensioner 3 (e.g., the drive wheel 4, a cover member 55, etc.) is located. Further, the lock mechanism 13 is positioned at an outer side of the end face 112 of the base frame 11, and the lock mechanism 13 is accommodated inside a retainer cover 14.

A vehicle sensor 15 for detecting rapid deceleration of a vehicle may be positioned in the retainer cover 14. The vehicle sensor 15 is provided with, for example, a spherical mass body and a sensor lever that is to be fluctuated by motion of the mass body. The vehicle sensor 15 may be fitted into an opening formed in the end face 112 of the base frame 11.

The spool 2 is provided with a cavity at the center, and a torsion bar 16 forming a shaft center is inserted and one end of the torsion bar 16 is connected to the spool 2. Further, one end of the spool 2 is coupled to a shaft core (spring core) of the spring unit 12. The spring unit 12 is provided with, for example, a flat spiral spring coupled to the spring core; a spring case for accommodating the flat spiral spring; and a spring cover for covering these components.

Note that a configuration for providing the winding force to the spool 2 is not limited to the above-described configuration of the spring unit 12. Further, in FIG. 1, the reference numeral 17 denotes a shaft bearing.

Further, the other end of the torsion bar 16 is coupled to a locking base 131 of the lock mechanism 13. As described below, the locking base 131 is configured to be capable of engaging the base frame 11, and the locking base 131 can cause the torsion bar 16 to be switched between a rotating state and a non-rotating state. Consequently, even if a load is applied in a direction to pull out the webbing in a state where the lock mechanism 13 is working (in a state where the locking base 131 engages the base frame 11), the spool 2 may be maintained in the non-rotating state until a load that is greater than or equal to a predetermined threshold value is applied to the torsion bar 16. Then, upon a load that is greater than or equal to the predetermined threshold value is applied to the torsion bar 16, the torsion bar 16 is twisted and, as a result, a relative rotational motion of the spool 2 is generated, and the webbing is pulled out.

The lock mechanism 13 is provided with, for example, the locking base 131 coupled to the other end of the torsion bar 16; the pawl 132 movably attached to the locking base 131; a cover plate 133 for restricting movement of the pawl 132 in a direction of the shaft; a lock gear 134 rotatably attached to the outer side of the locking base 131; and a flywheel 135 attached to the lock gear 134 to be capable of being fluctuated.

Note that the lock mechanism 13 is not limited to the depicted configuration, and existing ones with various configurations may be freely selected to be used. Further, in FIG. 1, the reference numeral 136 denotes a pawl spring, and the reference numeral 137 denotes a hook spring.

The locking base 131 is provided with a circular disk part 131a; a drive wheel support part 131b having a polygonal column shape that is formed at the side of the spool 2 of the disk part 131a and that supports the drive wheel 4; and a torsion bar support part 131c into which the other end of the torsion bar 16 is inserted. In the depicted example, the spool 2, the torsion bar 16, the locking base 131, etc., are arranged on a concentric shaft, whereby the rotation axis of the spool 2 is formed.

Here, a case is described in which the drive wheel 4 is secured to the locking base 131; however, the configuration is not limited to this. For example, a pinion gear coupled to the spool 2 may be inserted inside the drive wheel 4, and rotation of the drive wheel 4 may be transmitted to the spool 2 through the pinion gear by engaging the internal teeth of the drive wheel 4 and external teeth of the pinion gear.

According to the lock mechanism 13 provided with the above-described configuration, when the speed of the webbing is faster than normal pulling out speed, namely, when the withdrawal acceleration of the webbing exceeds the predetermined threshold value, the flywheel 135 is fluctuated to engage the internal teeth of the retainer cover 14, and the rotation of the lock gear 134 is restricted. Further, when the vehicle sensor 15 is operated, the sensor lever engages the external teeth 134a of the lock gear 134, and the rotation of the lock gear 134 is restricted.

Then, when the rotation of the lock gear 134 is restricted, relative rotation occurs between the locking base 131 and the lock gear 134. In accordance with this relative rotation, the pawl 132 moves toward an outer side in the radial direction, and a tip of the pawl 132 engages the internal teeth formed in the opening 112a of the base frame 11 (i.e., the locking base 131 engages the base frame 11 through the pawl 132). As a result, the rotation of the locking base 131 is restricted, and the rotation of the spool 2 is restricted. Consequently, the webbing is locked so as not to be pulled out.

Note that, in a normal state (a case where the withdrawal acceleration of the webbing is less than or equal to the predetermined threshold value), the lock mechanism 13 does not work, and the locking base 131 and the lock gear 134 rotate together in accordance with the rotation of the spool 2. Thus, in the normal state, relative rotation between the locking base 131 and the lock gear 134 does not occur, and the pawl 132 maintains a state in which the pawl 132 is retracted to a position at which the pawl 132 does not interfere with the internal teeth formed in the opening 112a of the base frame 11.

The pretensioner 3 is a component for removing a slack in the webbing by causing the drive wheel 4 to rotate by a power transmission unit 5 during an emergency, such as a vehicle collision. Similar to a usual power transmission unit, the power transmission unit 5 is provided with the elongated resin component 51 that is a power transmission component; a pipe 52; a gas generator 53; a piston 54; and the cover member 55.

The elongated resin component 51 is an elongated component formed of a plastic deformable resin (a resin rod). Here, "elongated component" implies a component such that the length is sufficiently greater than its diameter (e.g., several times to tens of times or more). The pipe 52 is a pressure container forming an injection cylinder of the elongated resin component 51. As the pipe 52 is required to have a certain length, the pipe 52 is bent so as to be arranged along one or more side surfaces of the base frame 11. Note that the elongated resin component 51 may be divided into a plurality of parts, or the elongated resin component 51 may be formed of a plurality of elongated resin components 51.

The gas generator 53 is attached to a rear end part of the pipe 52. The piston 54 is formed such that, upon receiving an operating gas supplied from the gas generator 53, the piston 54 slides on the inner surface of the pipe 52, while sealing it. For example, as illustrated in FIG. 2A, the cover member 55 covers an outer circumference of the drive wheel 4 while forming a passage 55a of the elongated resin component 51.

Here, operation of the above-described pretensioner 3 is described. As illustrated in FIG. 2A, in the initial state, the elongated resin component 51 is accommodated inside the pipe 52. At this time, the tip of the elongated resin component 51 is positioned at an outlet of the pipe 52 at which the tip of the elongated resin component 51 does not interfere with the drive wheel 4. Note that, in FIG. 2A and FIG. 2B, for convenience of the description, a slight gas is provided between the inner surface of the pipe 52 and the elongated resin component 51; however, the gap is actually negligible.

During an emergency, such as a vehicle collision, a high pressure operating gas is supplied from the gas generator 53 to inside the pipe 52. The operating gas presses the piston 54 to slide inside the pipe 52. The piston 54 presses the elongated resin component 51 to move inside the pipe 52. The elongated resin component 51 extruded from the pipe 52 moves toward the engaging teeth 41 (specifically the first engaging tooth 411) formed on the outer circumference of the drive wheel 4. As illustrated in FIG. 2B, the elongated resin component 51 colliding with the first engaging tooth 411 engages the engaging teeth 41 while being plastically deformed, and moves the passage 55a while rotating the drive wheel 4.

In the pretensioner 3 using the elongated resin component 51, the load becomes maximum during initial motion at which the elongated resin component 51 causes the engaging tooth 41 of the drive wheel 4 to engage the side surface of the elongated resin component 51. Accordingly, for such a pretensioner 3, it is important to find an efficient way to to convert the kinetic energy of the elongated resin component 51 into rotational energy of the drive wheel 4.

Here, positional relationship between the drive wheel 4 and the elongated resin component 51 is described by referring to FIG. 3A. As depicted, the drive wheel 4 is provided with, for example, eighteen engaging teeth 41, each having the same shape. Note that the number of the teeth in the engaging teeth 41 can be any number, and the number of the teeth in the engaging teeth 41 is not limited to the depicted number. Further, when a rotation center of the drive wheel 4 is denoted by O, each of the engaging teeth 41 is symmetrically formed with respect to a straight line Ct connecting the tip and the rotation center O. Note that the engaging teeth 41 may be symmetrically formed with respect to the straight line Ct.

Further, the elongated resin component 51 has a cylindrical shape with a diameter D, which is provided with a front end face 51a and a side face 51b (peripheral face). The front end face 51a forms a flat surface with a perpendicular line that is the center line Cr of the elongated resin component 51.

Here, for convenience of the description, in the initial state illustrated in FIG. 2A, one of the engaging teeth 41 facing the front end face 51a of the elongated resin component 51 is referred to as the first engaging tooth 411, and another one of the engaging teeth 41 adjacent to the first engaging tooth 411 in a direction opposite to the rotation direction (i.e., the counter rotation direction) of the drive wheel 4 is referred to as the second engaging tooth 412.

As depicted, the first engaging tooth 411 is provided with a gear tooth surface 411a that contacts the front end face 51a of the elongated resin component 51 in a planer manner. Further, the second engaging tooth 412 is configured such that, when the gear tooth surface 411a of the first engaging tooth 411 contacts the front end face 51a of the elongated resin component 51 in a planer manner, the tip 412a of the second engaging tooth 412 contacts the side surface 51b of the elongated resin component 51.

Namely, in the pretensioner 3 according to the example, the drive wheel 4 is formed such that, when the gear tooth surface 411a of the first engaging tooth 411 contacts with the front end face 51a of the elongated resin component 51 in a planer manner, the second engaging tooth 412 contacts the side face 51b of the elongated resin component 51. In other words, in the pretensioner 3, the drive wheel 4 is formed such that, when the second engaging tooth 412 contacts the side face 51b of the elongated resin component 51, the gear tooth surface 411a of the first engaging tooth 411 is caused to contact the front end face 51a of the elongated resin component 51 in a planer manner.

Note that, for identifying the shape of the engaging teeth 41 of the drive wheel 4, it is required to identify, in advance, a position of the center line Cr and a diameter D of the elongated resin component 51, and to identify, in advance, a position of the rotation center O and a pitch (the number of the engaging teeth 41) of the drive wheel 4.

In such a pretensioner 3, as illustrated in FIG. 3B, when the elongated resin component 51 moves in the direction Sr in the figure to contact the first engaging tooth 411, the drive wheel 4 rotates in the direction Rg in the figure. Then, as depicted, the front end face 51a of the elongated resin component 51 contacts the gear tooth surface 411a of the first engaging tooth 411 in a planer manner, and, at the same time, the tip 412a of the second engaging tooth 412 contacts the side face 51b of the elongated resin component 51.

Further, the elongated resin component 51 moves in the direction Sr in the figure, and, at the same time, the front end face 51a presses the gear tooth surface 411a of the first engaging tooth 411 to cause the drive wheel 4 to rotate in the direction Rg. Then, simultaneously with the rotation of the drive wheel 4, the tip 412a of the second engaging tooth 412 rotates in the direction Rq in the figure to bite the side face 51b of the elongated resin component 51.

Consequently, the kinetic energy of the elongated resin component 51 can be efficiently converted into rotational energy, so that the drive wheel 4 can be efficiently rotated, while mitigating concentration of stress generated in the elongated resin component 51.

Figure 4A:
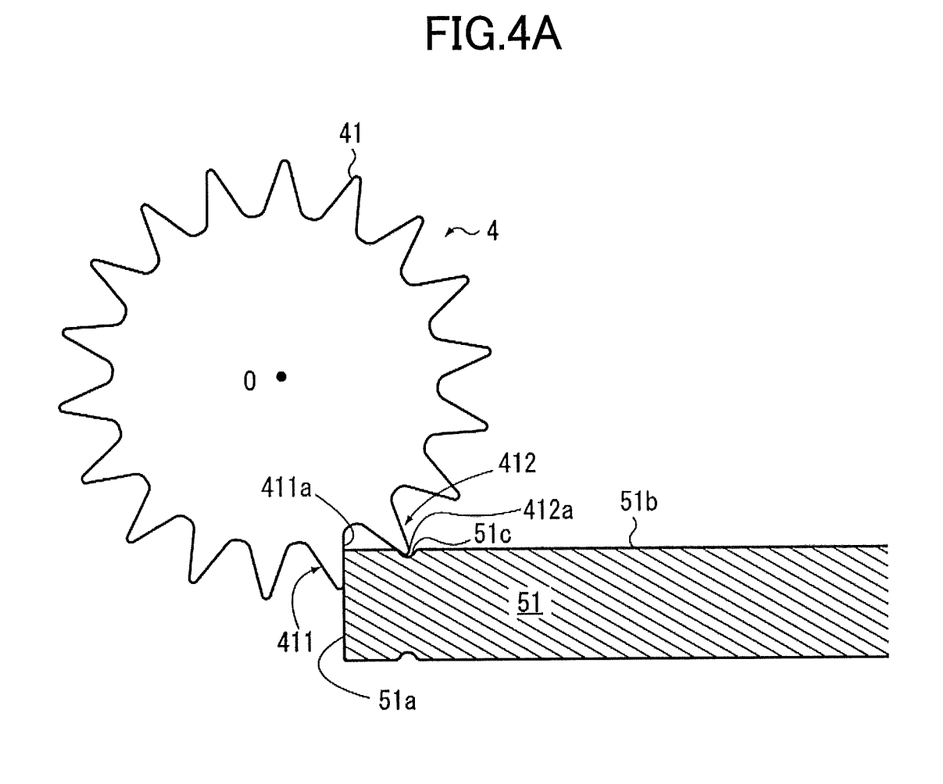
FIG. 4A is a partially enlarged view of a pretensioner according to a second example of the present disclosure, which indicates positional relation between a drive wheel and an elongated resin component.
Figure 4B:
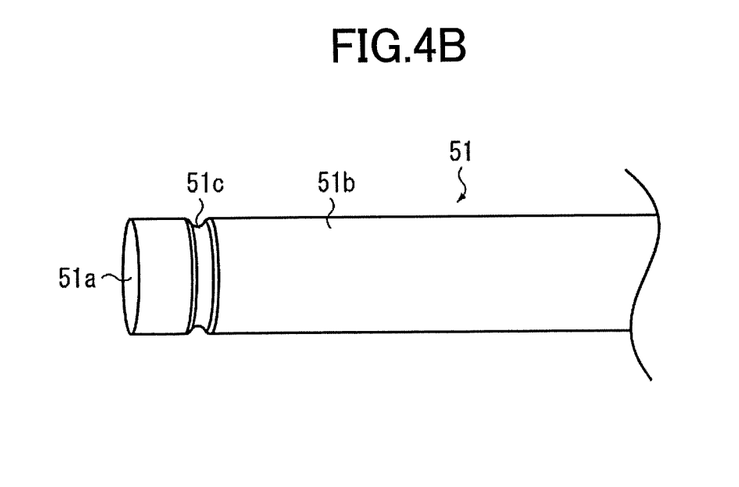
FIG. 4B is a perspective view illustrating a tip of the elongated resin component.
Figure 5A:
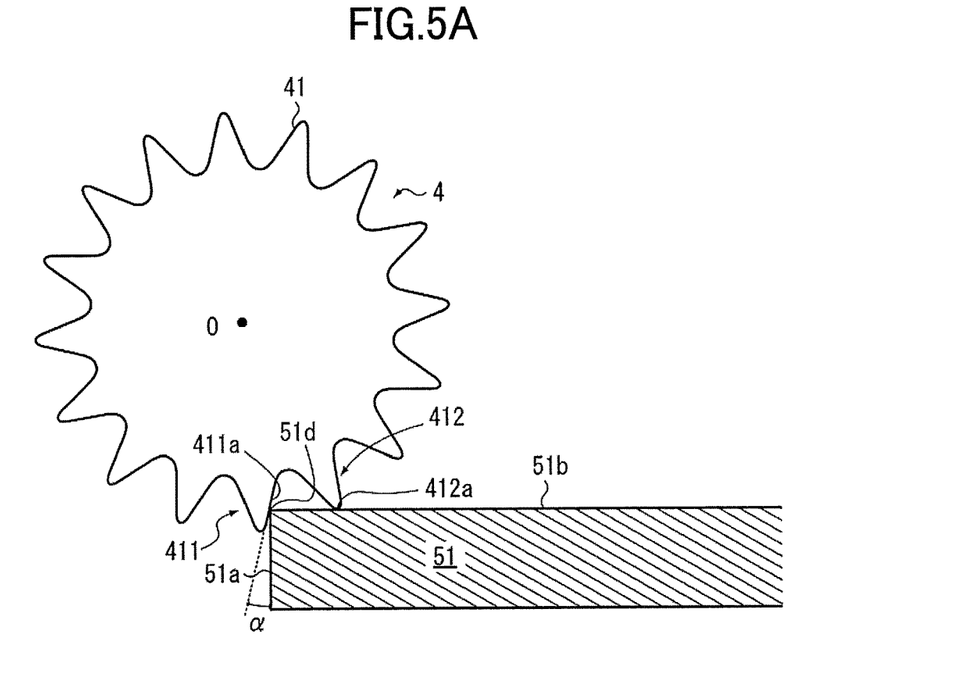
FIG. 5A is a partially enlarged view illustrating a pretensioner according to a third example of the present disclosure.
Figure 5B:
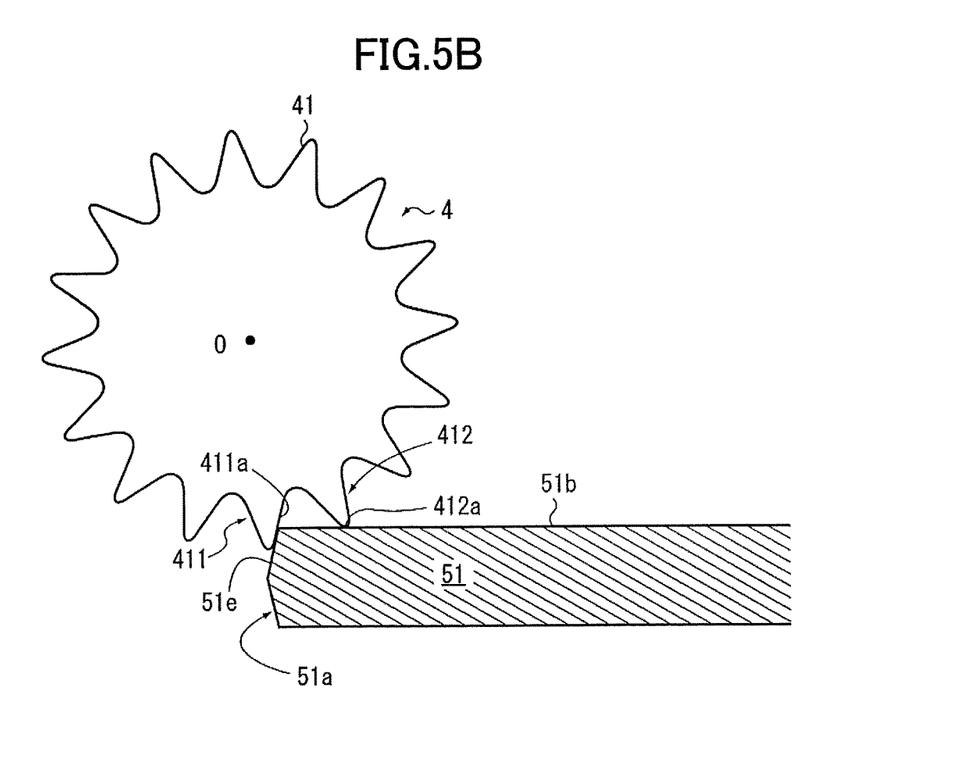
FIG. 5B is a partially enlarged view illustrating a pretensioner according to a fourth example of the present disclosure.
Figure 6A:
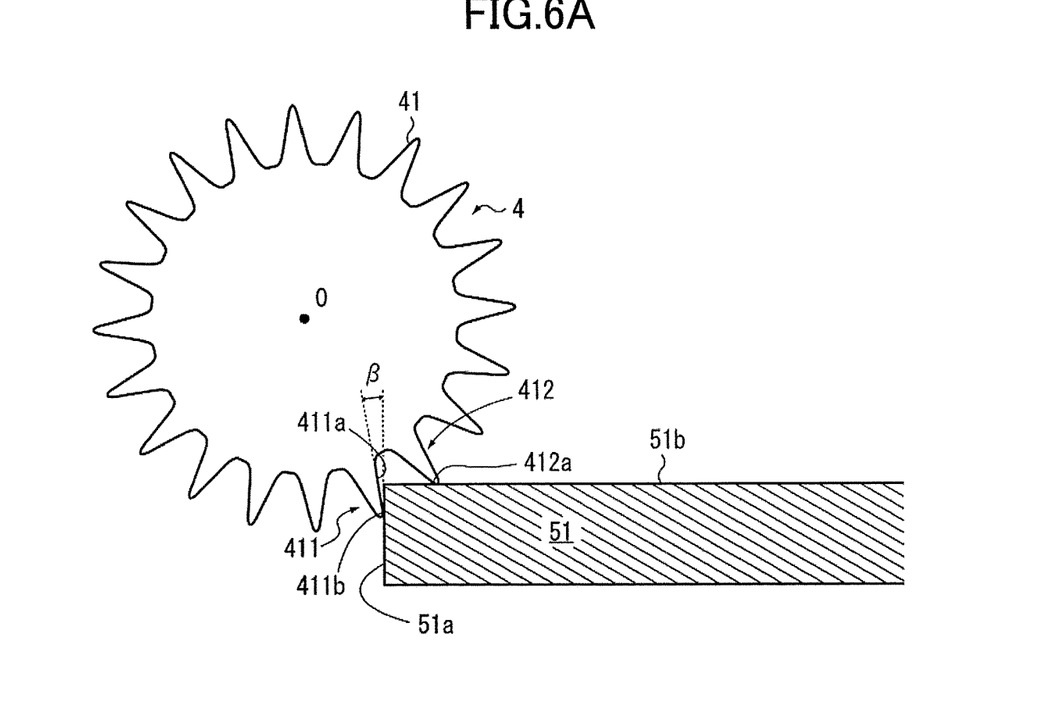
FIG. 6A is a partially enlarged view illustrating a pretensioner according to a fifth example of the present disclosure.
Figure 6B:
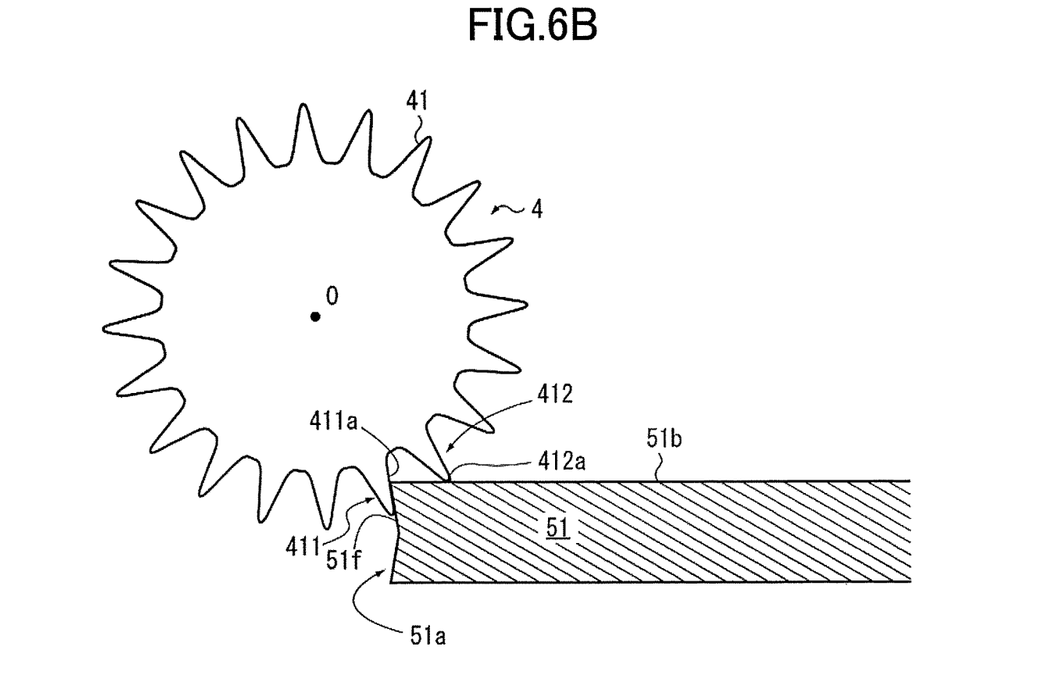
FIG. 6B is a partially enlarged view illustrating a pretensioner according to a sixth example of the present disclosure.

Next, the pretensioners 3 according to other examples of the present disclosure are described by referring to FIG. 4A through FIG. 6B. Here, FIG. 4A is a partially enlarged view of the pretensioner according to a second example of the present disclosure, which indicates positional relation between a drive wheel and an elongated resin component, and FIG. 4B is a perspective view illustrating a tip of the elongated resin component. FIG. 5A is a partially enlarged view illustrating a pretensioner according to a third example of the present disclosure, and FIG. 5 is a partially enlarged view illustrating a pretensioner according to a fourth example of the present disclosure. FIG. 6A is a partially enlarged view illustrating a pretensioner according to a fifth example of the present disclosure, and FIG. 6B is a partially enlarged view illustrating a pretensioner according to a sixth example of the present disclosure.

In the second example illustrated in FIG. 4A and FIG. 4B, a recess 51c for locking the tip 412a of the second engaging tooth 412 is formed in the side face 51b of the elongated resin component 51. Namely, the elongated resin component 51 is provided with, in the side face 51b, the recess 51c capable of locking the tip 412a of the second engaging tooth 412.

As illustrated in FIG. 4B, the recess 51c is annularly formed along the circumferential direction of the side face 51b of the elongated resin component 51. According to the second example, when the pretensioner 3 operates and the gear tooth surface 411a of the first engaging tooth 411 contacts the front end face 51a of the elongated resin component 51 in a planer manner, locking of the second engaging tooth 412 to the elongated resin component 51 is facilitated by locking the tip 412a of the second engaging tooth 412 to the recess 51c.

The third example illustrated in FIG. 5A is such that, when an edge part 51d of the tip of the elongated resin component 51 contacts the first engaging tooth 411, the gear tooth surface 411a of the first engaging tooth 411 and the front end face 51a of the elongated resin component 51 form an angle α. Here, the angle α implies a size of an angle which may include a manufacturing error and/or an assembling error (e.g., approximately from 2 to 3 degrees) that may occur when the gear tooth surface 411a of the first engaging tooth 411 and the front end face 51a of the elongated resin component 51 are caused to contact each other in a planer manner (i.e., the angle α=0°). Note that, in FIG. 5A, for convenience of the description, the angle α is exaggerated.

The fourth example illustrated in FIG. 5B is such that, at the tip of the elongated resin component 51, a convex tapered surface 51e is formed, which contacts the gear tooth surface 411a of the first engaging tooth 411 in a planer manner. For example, the tapered surface 51e is formed of a conical surface formed to protrude from the tip of the elongated resin component 51. As described above, by processing the tip of the elongated resin component 51, the first engaging tooth 411 and the elongated resin component 51 can be adjusted to contact each other in a planer manner.

The fifth example illustrated in FIG. 6A is such that, when the front end face 51a of the elongated resin component 51 contacts a tip 411b of the first engaging tooth 411, the gear tooth surface 411a of the first engaging tooth 411 and the front end face 51a of the elongated resin component 51 form an angle β. Here, the angle β implies a size of an angle which may include a manufacturing error and/or an assembling error (e.g., approximately from 2 to 3 degrees) that may occur when the gear tooth surface 411a of the first engaging tooth 411 and the front end face 51a of the elongated resin component 51 are caused to contact each other in a planer manner (i.e., the angle β=0°). Note that, in FIG. 6A, for convenience of the description, the angle β is exaggerated.

The sixth example illustrated in FIG. 6B is such that, at the tip of the elongated resin component 51, a concave tapered surface 51f is formed, which contacts the gear tooth surface 411a of the first engaging tooth 411 in a planer manner. For example, the tapered surface 51f can be formed by recessing the tip of the elongated resin component 51 into a conical shape. As described above, by processing the tip of the elongated resin component 51, the first engaging tooth 411 and the elongated resin component 51 can be adjusted to contact each other in a planer manner.

In the examples illustrated in FIG. 5A and FIG. 6A, in the present specification, contacting the first engaging tooth 411 and the elongated resin component 51 in an approximately planer manner implies that the angle may include a manufacturing error and/or an assembling error that may occur when the gear tooth surface 411a of the first engaging tooth 411 and the front end face 51a of the elongated resin component 51 are caused to contact each other in a planer manner (i.e., the angle α or β=0°).

Figure 7:
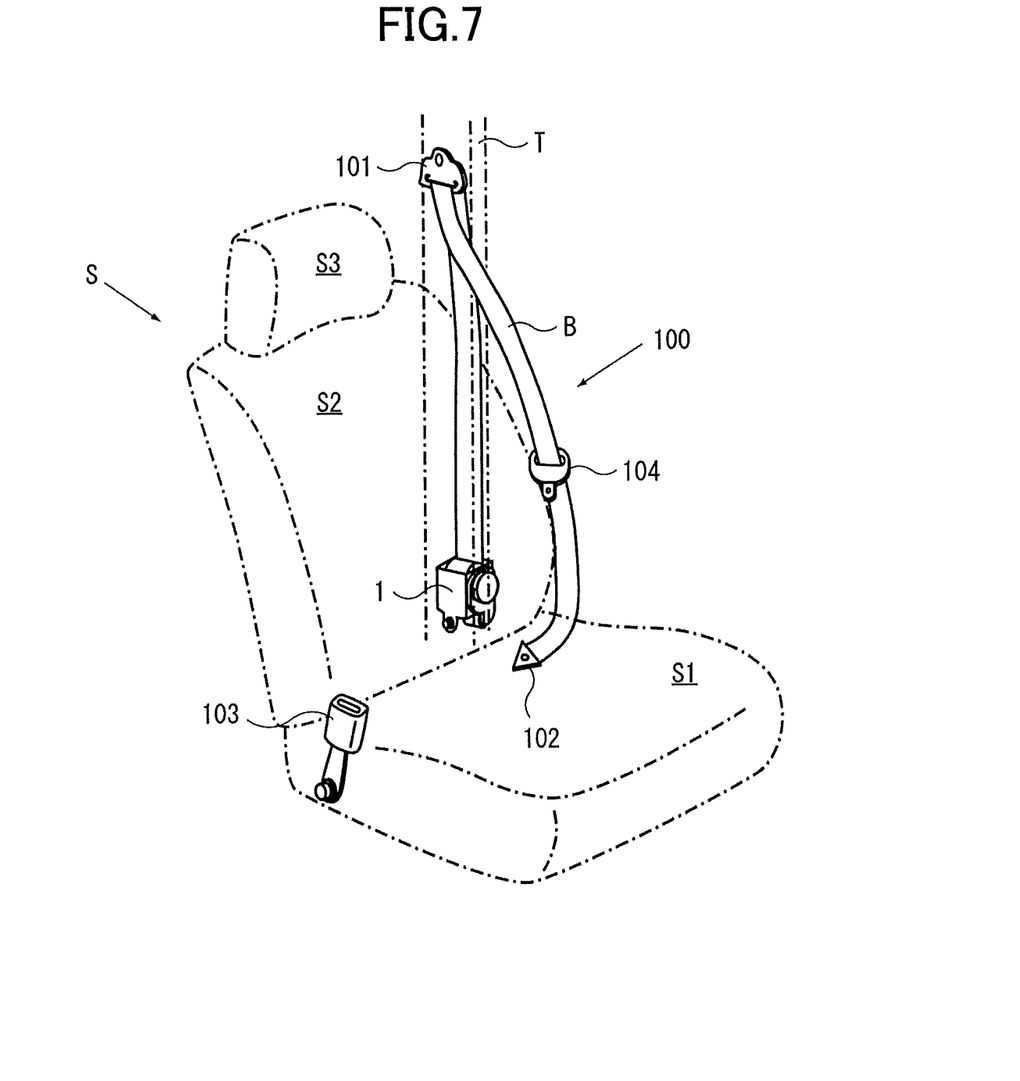
FIG. 7 is a diagram illustrating an overall configuration of a seatbelt device according to an example of the present disclosure.

Next, the seatbelt device according to an example of the present disclosure is described by referring to FIG. 7. Here, FIG. 7 is a diagram illustrating an overall configuration of a seatbelt device according to the example of the present disclosure. Note that, in FIG. 7, for convenience of the description, components other than the seatbelt device are depicted by one-dot chain lines. Further, the seatbelt device 100 depicted in FIG. 7 illustrates the seatbelt device installed at a front seat of the vehicle (a driver's seat or a front passenger's seat).

The seatbelt device 100 according to the example illustrated in FIG. 7 includes a webbing B for fastening a passenger; a seatbelt retractor 1 for winding up the webbing B; a guide anchor 101, which is installed at a vehicle body side, for guiding the webbing B; a belt anchor 102 for securing the webbing B at the vehicle body side; a buckle 103 positioned at a side surface of the seat S; and a seatbelt tongue 104 attached to the webbing B. The seatbelt retractor 1 is provided with, for example, the configuration illustrated in FIG. 1.

The seat S is provided with, for example, a seat part S1 on which a passenger is seated; a backrest part S2 positioned behind the passenger; and a headrest part S3 for supporting a head of the passenger. The seatbelt retractor 1 is built, for example, in a B pillar T of the vehicle body. Further, in general, the buckle 103 is often positioned on a side surface of the seat part S1, and the belt anchor 102 is often positioned on a bottom surface of the seat part S1. Further, the guide anchor 101 is often positioned on the B pillar T. Then, one end of the webbing B is connected to the belt anchor 102, and the other end of the webbing B is connected to the seatbelt retractor 1 through the guide anchor 101.

Accordingly, when the seatbelt tongue 104 is to fit the buckle 103, the webbing B is to be pulled out from the seatbelt retractor 1 while sliding on an insertion hole of the guide anchor 101. Further, when a passenger wears the seat belt or releases the seat belt to get off the vehicle, by the action of the sprint unit 12 of the seatbelt retractor 1, the webbing B is rewound until a fixed load is applied.

The pretensioner, the seatbelt retractor, the seatbelt device, and the method of manufacturing the pretensioner are described above by the examples. However, the present invention is not limited to the examples, and various modifications and improvements may be made within the scope of the present invention. For example, the present invention may be applied to a seatbelt device used for a rear seat of the vehicle, or the present invention may be applied to a seatbelt device used for a vehicle other than an automobile.

The present application is based on and claims the benefit of priority of Japanese Priority Application No. 2016-255444 filed on Dec. 28, 2016, the entire contents of which are hereby incorporated herein by reference.

What is claimed is:

1. A pretensioner comprising:
    a drive wheel provided with a plurality of engaging teeth for rotating a spool, the spool for winding up a webbing for fastening a passenger; and
    an elongated resin component that transmits power to the drive wheel during an emergency, wherein a side surface of the elongated resin component has a cylindrical shape,
    wherein, by identifying, in advance, a position of a center line of the elongated resin component, a diameter of the elongated resin component, a position of a rotation center of the drive wheel, and a number of the plurality of engaging teeth, the plurality of teeth is positioned such that, when one engaging tooth is caused to contact a tip of the elongated resin component so that an angle formed by a gear tooth surface of the one engaging tooth and a front end face of the elongated resin component is from −3 degrees to +3 degrees, another engaging tooth adjacent to the one engaging tooth in a direction opposite to a rotation direction contacts the side surface of the elongated resin component.

2. The pretensioner according to claim 1, wherein the one engaging tooth is provided with the gear tooth surface to contact the elongated resin component in a planer manner.

3. The pretensioner according to claim 1, wherein the elongated resin component is provided with a tapered surface to contact the gear tooth surface of the one engaging tooth in a planer manner.

4. The pretensioner according to claim 1, wherein the elongated resin component is provided with a recess on the side surface, the recess being capable of locking a tip of the adjacent engaging tooth.

5. A seatbelt retractor comprising:
    a spool for winding up a webbing for fastening a passenger; and
    a pretensioner for winding up the webbing to remove a slack during an emergency,
    wherein the pretensioner includes
        a drive wheel provided with a plurality of engaging teeth for driving the spool, and
        an elongated resin component that transmits power to the drive wheel during the emergency, wherein a side surface of the elongated resin component has a cylindrical shape, and
    wherein, by identifying, in advance, a position of a center line of the elongated resin component, a diameter of the elongated resin component, a position of a rotation center of the drive wheel, and a number of the plurality of engaging teeth, the plurality of teeth is positioned such that, when one engaging tooth is caused to contact a tip of the elongated resin component so that an angle formed by a gear tooth surface of the one engaging tooth and a front end face of the elongated resin component is from −3 degrees to +3 degrees, another engaging tooth adjacent to the one engaging tooth in a direction opposite to a rotation direction contacts the side surface of the elongated resin component.

6. A seatbelt device comprising:
a webbing for fastening a passenger;
a seatbelt retractor for winding up the webbing;
a buckle positioned at a seat, and
a seatbelt tongue attached to the webbing,
wherein the seatbelt retractor includes
a spool for winding up the webbing, and
a pretensioner for winding up the webbing to remove a slack during an emergency,
wherein the pretensioner includes
a drive wheel provided with a plurality of engaging teeth for driving the spool, and
an elongated resin component that transmits power to the drive wheel during the emergency, wherein a side surface of the elongated resin component has a cylindrical shape, and
wherein, by identifying, in advance, a position of a center line of the elongated resin component, a diameter of the elongated resin component, a position of a rotation center of the drive wheel, and a number of the plurality of engaging teeth, the plurality of teeth is positioned such that, when one engaging tooth is caused to contact a tip of the elongated resin component so that an angle formed by a gear tooth surface of the one engaging tooth and a front end face of the elongated resin component is from −3 degrees to +3 degrees, another engaging tooth adjacent to the one engaging tooth in a direction opposite to a rotation direction contacts the side surface of the elongated resin component.

7. A method of manufacturing a pretensioner including
a drive wheel provided with a plurality of engaging teeth for rotating a spool, the spool for winding up a webbing for fastening a passenger, and
an elongated resin component that transmits power to the drive wheel during an emergency, wherein a side surface of the elongated resin component has a cylindrical shape,
wherein, in the method of manufacturing the pretensioner, by identifying, in advance, a position of a center line of the elongated resin component, a diameter of the elongated resin component, a position of a rotation center of the drive wheel, and a number of the plurality of engaging teeth, the drive wheel is formed such that, when one engaging tooth is caused to contact a tip of the elongated resin component so that an angle formed by a gear tooth surface of the one engaging tooth and a front end face of the elongated resin component is from −3 degrees to +3 degrees, another engaging tooth adjacent to the one engaging tooth in a direction opposite to a rotation direction contacts the side surface of the elongated resin component.

8. The method of manufacturing the pretensioner according to claim 7, wherein a recess is formed on the side surface of the elongated resin component, the recess being for locking a tip of the adjacent engaging tooth.

* * * * *